US007497569B2

(12) United States Patent  
Webb

(10) Patent No.: US 7,497,569 B2
(45) Date of Patent: Mar. 3, 2009

(54) PARTIALLY ENTRAPPED FRAME HAVING A REMOVABLE LENS

(75) Inventor: Michael J. Webb, Scotts Valley, CA (US)

(73) Assignee: Bell Sports, Inc., Irving, TX (US)

( * ) Notice: Subject to any disclaimer, the term of this patent is extended or adjusted under 35 U.S.C. 154(b) by 0 days.

(21) Appl. No.: 11/936,907

(22) Filed: Nov. 8, 2007

(65) Prior Publication Data

US 2008/0137028 A1 Jun. 12, 2008

Related U.S. Application Data

(60) Provisional application No. 60/873,604, filed on Dec. 6, 2006.

(51) Int. Cl.
*G02C 1/04* (2006.01)
(52) U.S. Cl. .................... 351/106; 351/86; 351/103
(58) Field of Classification Search ............ 351/83, 351/86, 103, 106, 105, 41, 124, 158
See application file for complete search history.

(56) References Cited

U.S. PATENT DOCUMENTS

| 4,715,702 | A |   | 12/1987 | Dillon .................... 351/44 |
| 4,867,550 | A |   | 9/1989  | Jannard ................... 351/47 |
| 5,144,344 | A |   | 9/1992  | Takahashi et al. ........... 351/44 |
| 5,208,614 | A |   | 5/1993  | Jannard ................... 351/41 |
| 5,587,747 | A | * | 12/1996 | Bernheiser ............... 351/105 |
| 5,602,603 | A |   | 2/1997  | Bondet ................... 351/41 |
| 5,610,668 | A |   | 3/1997  | Mage .................... 351/62 |
| 5,648,832 | A |   | 7/1997  | Houston et al. ........... 351/159 |
| 5,929,963 | A |   | 7/1999  | McNeal .................. 351/47 |
| 5,963,293 | A |   | 10/1999 | Jannard .................. 351/45 |
| 5,969,789 | A |   | 10/1999 | Houston et al. ........... 351/159 |
| 6,009,564 | A |   | 1/2000  | Tackles et al. ............. 2/436 |
| 6,010,217 | A |   | 1/2000  | Houston et al. ........... 351/159 |
| 6,086,199 | A |   | 7/2000  | Holland et al. ............ 351/86 |
| 6,168,271 | B1 |  | 1/2001  | Houston et al. ........... 351/41 |
| 6,357,873 | B1 |  | 3/2002  | Spindelbalker ........... 351/149 |
| 7,000,263 | B2 |  | 2/2006  | McNeal ................... 2/452 |
| 7,222,958 | B1 | * | 5/2007 | Chiou .................... 351/103 |

* cited by examiner

*Primary Examiner*—Hung X Dang
(74) *Attorney, Agent, or Firm*—Baker Botts L.L.P.

(57) ABSTRACT

An eyewear system includes a partially entrapped eyewear frame, a lens, and a latching mechanism. The lens is configured to be received into a lens groove of the partially entrapped eyewear frame. The lens includes a first edge with a latch catch and a second edge with a tab configured to be received by a recess of the partially entrapped eyewear frame. The latch mechanism is configured to allow removal of the lens from the partially entrapped eyewear frame and engage the latch catch of the lens to retain the lens in the partially entrapped eyewear frame.

12 Claims, 4 Drawing Sheets

PARTIALLY ENTRAPPED FRAME HAVING A REMOVABLE LENS

RELATED APPLICATIONS

This application claims the benefit under 35 U.S.C. § 119(e) of U.S. Provisional Application No. 60/873,604 filed Dec. 6, 2006, entitled "System and Methed for Lens Replacement in a Partially Entrapped Frame".

TECHNICAL FIELD

This disclosure relates in general to eyewear and more particularly to a partially entrapped frame having a removable lens.

BACKGROUND

There exists a category of eyewear which can be described as having interchangeable lenses that are held in a partially entrapped configuration. Partially entrapped refers to the condition where the frame is not circumferentially continuous around the edge (also known as profile) of a lens, creating one or more exposed sections of lens edge. Typically, this architecture is seen in the sports eyewear category, but also exists in the realm of Rx glasses and fashion glasses, or various combinations thereof. The frames may either have one lens which covers both eyes, or two independent lenses each covering one eye.

In sporting applications, interchangeability of lenses is desired due to different environmental conditions that the user may encounter. Different environments may warrant different levels of light attenuation and/or color filtration. Photochromatic lenses are available on the market to provide a range of light attenuation with a single lens, but do not offer variation in selective color filtration. Although they are convenient, they do not offer the ideal lens solution for all conditions. Further, fashion also plays a role in lens tint and color selection for many eyewear users. Accordingly, specific independent lenses for specific conditions remain desirable.

In a typical partially entrapped eyewear frame, a lens is attached to a frame via a lens groove interface. The lens groove interface generally includes a section of lens with counter-opposing hook details cut into its profile. The hook details are mated to a lens groove within the eyewear frame which has recesses that receive the lens hooks at or near the extents of the lens groove. Typically the lens fits into the frame with a slight interference fit induced by making the tangential path along the edge of the lens between the hooks to be slightly longer than the corresponding tangential path along the lens groove between the hook recesses. Thus, in a frame of this design, a lens generally cannot be freely installed in or removed from a frame. Specifically, the frame and/or lens must be deformed to overcome the interferences at the lens hooks or the constraining walls of the lens groove. While this is a feasible means to install and uninstall lenses, this may not be desirable from a user's point of view. It is often physically difficult to perform this task and leaves the user concerned that damage is being done to the eyewear. Also, the consumer is likely to grip the optical surfaces of the lens while installing it which can lead to fingerprinting and/or scratching the lens.

SUMMARY OF THE DISCLOSURE

The present disclosure provides a partially entrapped frame having a removable lens that substantially eliminates or reduces at least some of the disadvantages and problems associated with previous methods and systems.

According to one embodiment, an eyewear system includes a partially entrapped eyewear frame, a lens, and a latching mechanism. The lens is configured to be received into a lens groove of the partially entrapped eyewear frame. The lens includes a first edge with a latch catch and a second edge with a tab configured to be received by a recess of the partially entrapped eyewear frame. The latch mechanism is configured to allow removal of the lens from the partially entrapped eyewear frame and engage the latch catch of the lens to retain the lens in the partially entrapped eyewear frame.

In an embodiment, the latching mechanism has a first low energy state associated with an opened position, a second low energy state associated with a closed position, and a high energy state associated with a position between the open position and the closed position. In a particular embodiment, the latching mechanism includes an lever, a latch, and a cap. The latch is coupled to the lever and has a pin and a lobe. The cap includes a slot for receiving the pin and is configured to control the motion of the lobe. Positioning the lever in a closed position shifts the lobe to engage the latch catch of the lens.

Technical advantages of certain embodiments of the eyewear system may include lenses which are releasably retained within frame. This may allow for a lens to be readily installed and/or removed from the frame. Another advantage of particular embodiments of the present eyewear system is that it enables lens replacement without touching the lens surface. Thus, a user can change a lens without leaving fingerprints or scratches on the lens surface.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1:
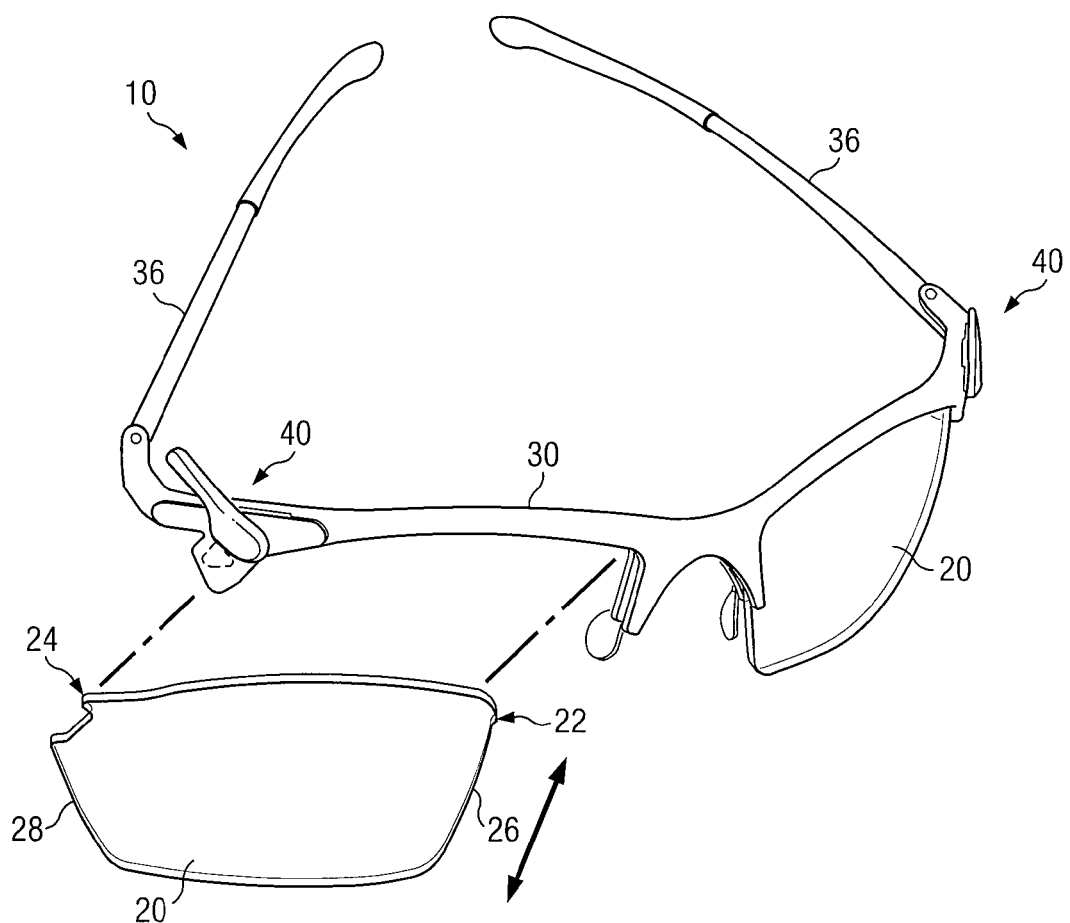
FIG. 1 is a simplified block diagram illustrating an item of eyewear having a removable lens in accordance with a particular embodiment.

FIG. 1 illustrates an item of eyewear 10 in accordance with a particular embodiment. Examples of eyewear 10 include, but are not limited to, eyeglasses, sunglasses, and safety glasses. In the illustrated embodiment, eyewear 10 includes a partially entrapped frame 30 which may retain lenses 20. Eyewear 10 also includes latching mechanisms 40 which may facilitate the retention of a respective lens 20 in frame 30. For purposes of this specification, the term "partially entrapped" references a condition wherein the frame is not circumferentially continuous around the entire edge/profile of a lens.

In various embodiments, one or more lenses 20 of eyewear 10 may be replaceable and thus readily removable from frame 30. More particularly, latching mechanisms 40 may each releasably retain a respective lens 20 within frame 30. In one embodiment, latching mechanisms 40 may secure a lens 20 in frame 30 by creating an obstruction that prevents the removal of the lens 20 from frame 30. Retention of a lens 20 may also be effected by inducing an interference fit between the lens 20 and frame 30. The interference fit may be induced by locking or otherwise closing latching mechanism 40 which imposes paired compressive and tensile forces on lens 20 and frame 30, respectively. By contrast, opening a latching mechanism 40 may release the applied forces thereby permitting removal of a respective lens 20. Accordingly, lenses 20 may be installed and removed without a user having to apply a force directly to the lens surface.

Lenses 20 may serve various functions including magnifying images, protecting the facial region of a user, correcting vision (astigmatism, prismatic power, etc.), and blocking sunlight. According to a particular embodiment, each lens 20 includes a tab 22 and a latch catch 24 along medial and lateral edges 26 and 28, respectively. Tab 22 and latch catch 24 may assist in positioning and securing a lens 20 in frame 30. When lens 20 is properly positioned in frame 30, tab 22 may fit into a receiving recess 32 (illustrated in FIG. 3) located on a medial portion of frame 30. As will be described in greater detail, latch catch 24 may be engaged by latching mechanism 40 and thereby facilitate the retention of a lens 20 in frame 30.

To accommodate various applications and uses of eyewear 10, lenses 20 may encompass any suitable shape, structure, and/or material. In particular, each lens 20 may constitute a plurality of lenses. For example, a lens 20 may be a sealed double lens with an airspace in between. A double lens structure may be desirable to prevent fogging or provide extra ultra-violet (UV) protection. In certain embodiments, eyewear 10 may include a single lens 20 which forms a shield across frame 30. Additionally, depending on the intended function of eyewear 10, lenses 20 may be manufactured from a variety of materials including, but not limited to, polycarbonate, acrylic, or CR-39. Additionally, lenses 20 may be photochromatic, polarized, or tinted to provide a range of light attenuation, color filtration, and vision correction. It should be noted that the various embodiments of lenses 20 are provided for example purposes and should not limit the scope of the present disclosure.

Figure 2:
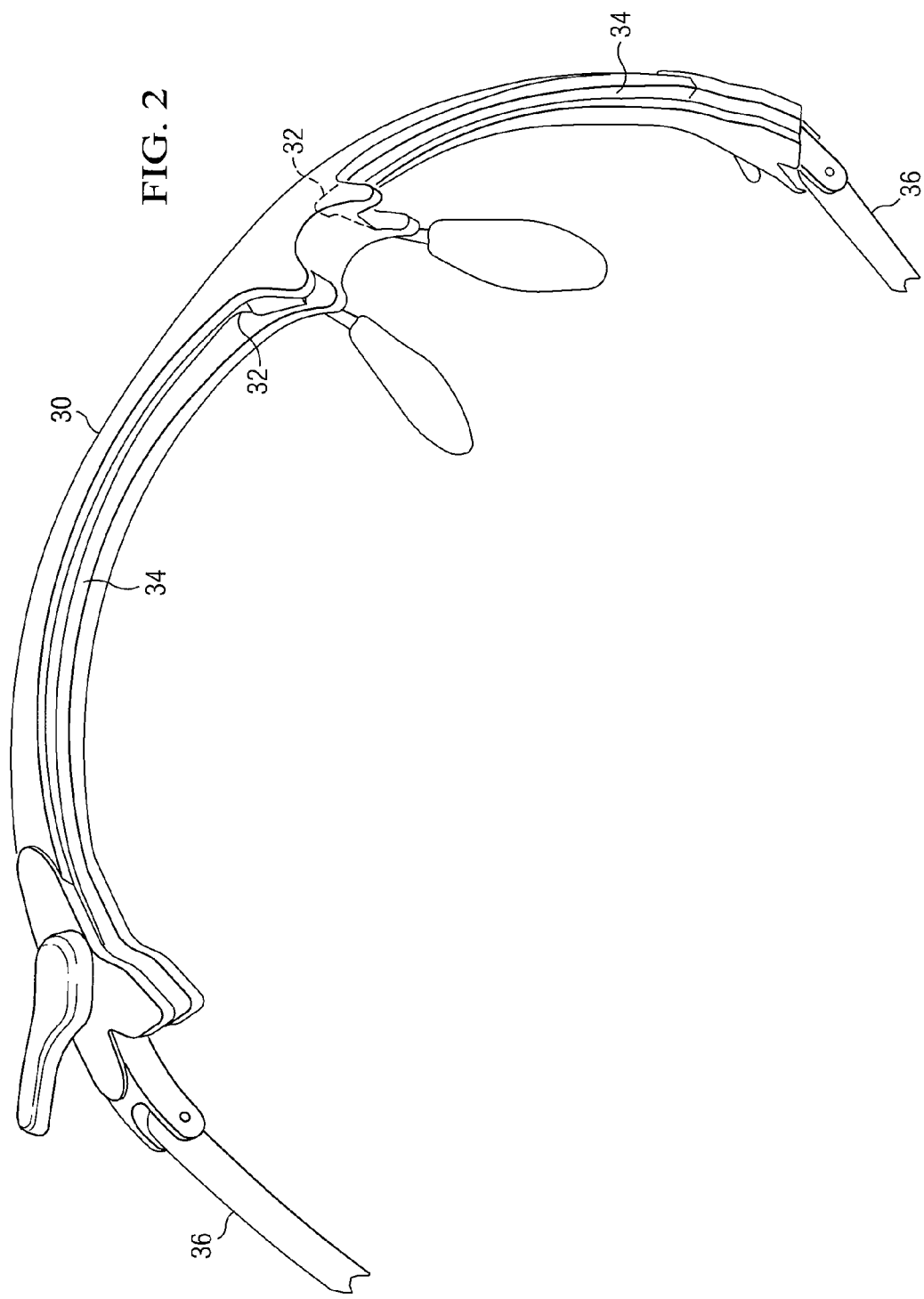
FIG. 2 is a simplified block diagram illustrating a frame in accordance with a particular embodiment.

Frame 30 may releasably retain lenses 20 in addition to securing eyewear 10 to the head of a user. As illustrated in FIG. 2, frame 30 may include receiving recesses 32, lens grooves 34, and arms 36. Recesses 32 may, as previously mentioned, receive a tab 22 of a lens 20 (shown in FIG. 2) and thereby assist in retaining and positioning a lens 20. Lens grooves 34 provide a track for receiving and retaining a respective lens 20. In particular embodiments, lens grooves 34 may have curved profiles which match the profile of the edge of a lens 20. As will be described in greater detail below, lens grooves 34 may facilitate the retention of lenses 20 by providing constant retaining surfaces along the engaged edge, inner face, and outer face of a lens 20. To secure and properly position eyewear 10 on the head of a user, frame 30 may also include arms 36. Arms 36 may be pivotally attached to the lateral ends of frame 30 and engage the head of a user when eyewear 10 is properly positioned over the facial region. Although the embodiment of frame 30 illustrated in FIG. 3 includes arms 36, frame 30 may include any suitable mechanism or components for securely positioning eyewear 10 on the head of a user. Accordingly, in alternate embodiments, frame 30 may include a strap or headband in addition to or instead of arms 36.

Latching mechanisms 40 are components which may releasably secure lenses 20 in frame 30. In particular, latching mechanisms 40 may shift between opened and closed positions to release and secure lenses 20 in frame 30. When in a closed position, a latching mechanism 40 may engage a lens 20 and thereby apply a force which places lens 20 in compression and a portion of frame 30 in tension. The paired compressive and tensile forces may induce an interference fit wherein lens 20 is securely retained by frame 30. By contrast, shifting latching mechanism 40 to an open position may release the applied force and retract a lobe thereby allowing for removal of lens 20 from frame 30.

Figure 3:
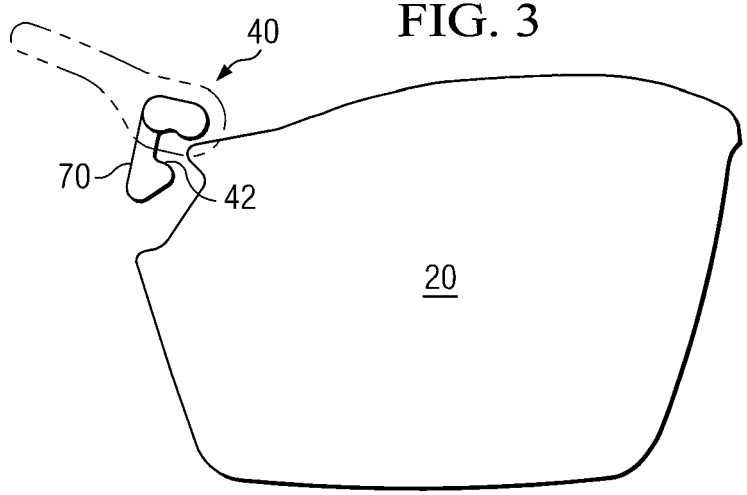
FIG. 3 is a simplified block diagram illustrating a latching mechanism situated in a partially closed/opened position in accordance with a particular embodiment.

With reference to FIG. 3, a latching mechanism 40 situated in a partially closed/opened position is provided. In the illustrated embodiment, latching mechanism 40 includes a lobe 42 which may engage the latch catch 24 of lens 20. When latching mechanism 40 is positioned in a closed position, lobe 42 may fully engage latch catch 24 and thereby create an obstruction to the escape of latch catch 24, as well as apply a compressive force to lens 20. The application of the compressive force and/or the obstruction may secure lens 20 in a frame (not illustrated in FIG. 3).

In an embodiment, shifting latching mechanism 40 to a closed position causes lobe 42 to engage latch catch 24 and thereby properly position lens 20 in a frame. More particularly, lobe 42 may align an upper edge of lens 20 in lens groove 32 of frame 30 (shown in FIG. 2). To release lens 20, latching mechanism 40 may be shifted to a fully opened position wherein lobe 42 disengages from latch catch 24. Disengaging lobe 42 from latch catch 24 may clear a removal path for latch catch 24 as well as release a compressive force applied by latching mechanism 40 to secure lens 20 in a frame. Accordingly, as best illustrated in FIG. 1, a user may readily install or remove a lens 20 from frame 30 when latching mechanism 40 is in an open position. It should be noted that latching mechanisms 40 may encompass multiple embodiments and include various components and configurations which facilitate the described functionality. Additionally, various methods for actuating latching mechanism 40 may be implemented to facilitate the installation and removal of a lens 20.

In a particular embodiment, lobe 42 of latching mechanism 40 may approach latch catch 24 along a path that is approximately tangent to the lens surface and toward latch catch 24. This directional motion may apply a compressive force on a lens 20 without directly imparting non-tangential forces to the lens surface. The application of non-tangential forces may cause optical distortion and premature cracking of the lens. According to a particular embodiment, the profile of lens 20 is generally convex between latch catch 24 and tab 22, and the corresponding profile of lens groove 34 is concave. In such an embodiment, the compressive force may drive a section of the lens profile into lens groove 34, thereby ensuring that the lens may not escape the retaining side walls of the lens groove 34. Accordingly, when lens 20 properly positioned in a frame 30, this normal force may be constrained by the walls of lens groove 34, (illustrated in FIG. 2) which provides a constant surface along an upper edge of a lens 20, to prevent the lens 20 from popping out of frame 30. The described compressive force may be advantageous for securing a lens 20 in frame 30 as it increases the contact pressure between the lens 20 and frame 30 along lens groove 34.

Figure 4:
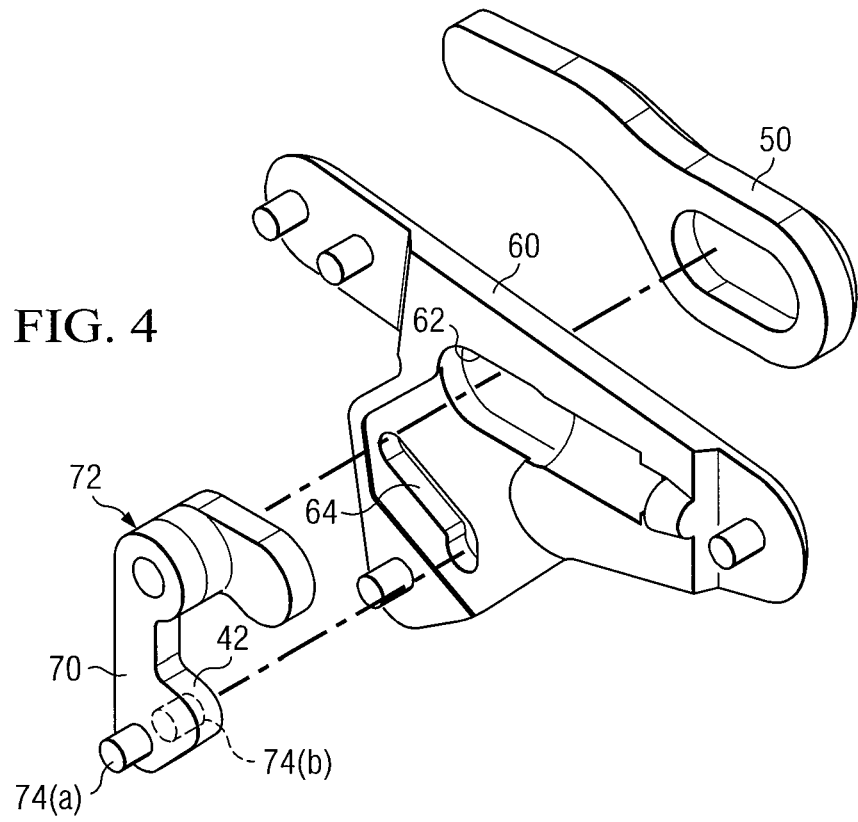
FIG. 4 is an exploded view of a latching mechanism in accordance with a particular embodiment.

With reference now to FIG. 4, an exploded view of an embodiment of a latching mechanism 40 is provided. As illustrated, latching mechanism 40 includes a lever 50 which is moveably coupled to a cap 60 via a latch 70. Lever 50 represents a component through which a user may switch latching mechanism 40 between opened and closed positions. During installation and/or removal of a lens, the motion of lever 50 may be controlled via barrel 72 and coaxial pins 74 of latch 70. As illustrated, pin 74a and barrel 70 may travel in slots 62 and 64, respectively. In certain embodiments, frame 30 may have a channel corresponding to slot 64 for receiving pin 74b. This channel in frame 30 may assist in stabilizing latch 70 during rotation of lever 50. Although not illustrated, cap 60 and latch 70 may be affixed to frame 30 in any suitable manner. Alternatively, cap 60 and slots 62 and 64 may define portions of a frame 30. Further, in certain embodiments, lever 50 and latch 70 may be combined to form a single component.

By manipulating the shapes and locations of slots 62 and 64 and/or the location of barrel 72 and pins 74, a favorable movement path may be prescribed for lobe 42. For example, as mentioned, lobe 42 may travel in a path that engages latch catch 24 in such a way as to put the lens into compression once the latch catch is engaged. Accordingly, slots 62 and 64, barrel 72, and pins 74 may be designed to facilitate this motion. In a particular embodiment, the movement of lobe 42 is approximately linear and in an orientation which readily clears a latch catch of a lens (not illustrated in FIG. 4) for lens removal. In certain embodiments, when lever 50 is shifted between opened and closed positions, barrel 72 and pin 74a, in combination with slots 62 and 64, may produce a "virtual pivot" motion of lever 50. More particularly, lever 50 may not move around a static pivot location, but rotate about a pivot location that moves as it rotates through a defined range of motion. In other embodiments, other techniques besides using a pin and barrel with associated slots may be used to guide the movement of lobe 42.

In certain embodiments, shifting lever 50 about the virtual pivot may impart an over-center behavior on the latching mechanism. As used in this specification, "over-center" references that the latching mechanism has two low energy states: 1) fully opened; and 2) fully closed. When a latch device 40 is in a fully opened position, there is no stress imparted on the latching mechanism 40 by the respective lens 20. By contrast, when a latching mechanism 40 is in a fully closed position, the latching mechanism 40 is in a non-maximum stress state due to stress imparted by the compressed lens 20. Additionally, there is a single peak high energy state that exists when latching mechanism 40 is positioned between the fully opened and fully closed positions. This high energy state correlates to a lobe 42 position that has maximum interference with the latch catch 24. One benefit of the over-center behavior is that latching mechanism 40 only has two preferred orientations: 1) fully opened; or 2) fully closed. Because no intermediate position of a latching mechanism is useful in the installation or removal of a lens, such a positioning mechanism may be advantageous for securing and releasing a lens 20 in frame 30. A further benefit may be that when a latch device 40 is fully closed, the forces from the respective lens 20 cause the latching mechanism 40 to seek the nearest low energy state, i.e. to seek the closed position. Accordingly, latching mechanism 40 may naturally remain in a closed position.

Figure 5A:
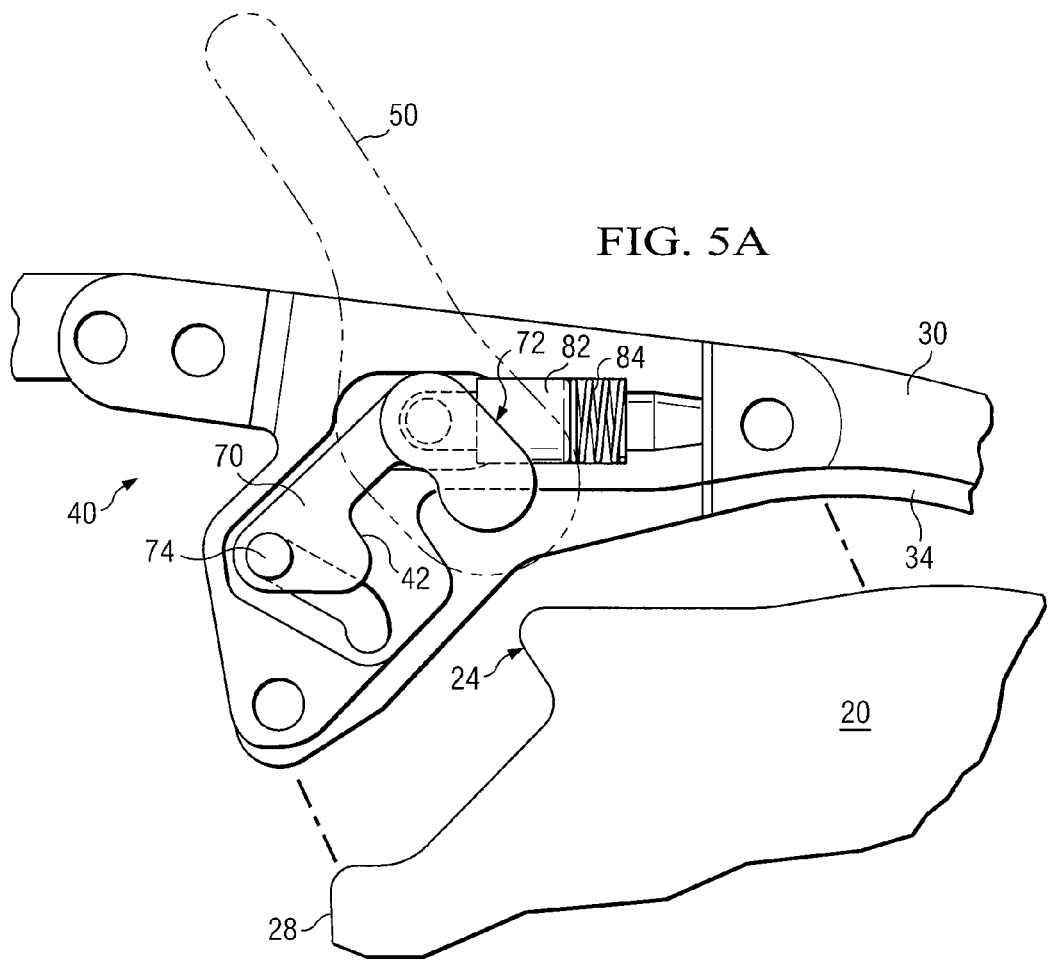
FIG. 5a is a simplified block diagram of a latching mechanism in a fully opened position in accordance with a particular embodiment.
Figure 5B:
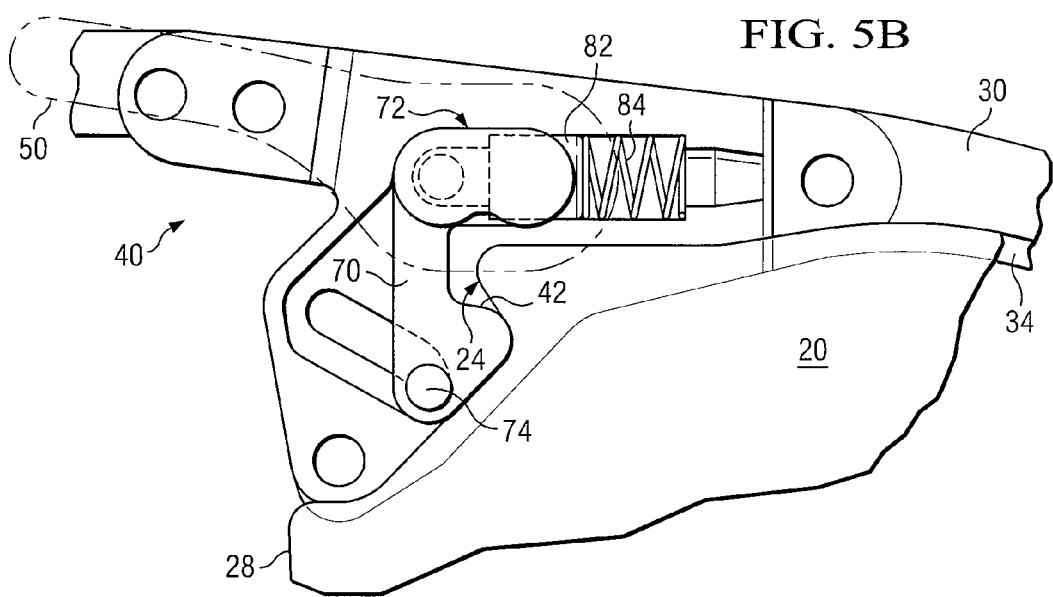
FIG. 5b is a simplified block diagram of a latching mechanism in a fully closed position in accordance with a particular embodiment.

Certain embodiments of latching mechanism 40 may include various components which facilitate the described over-center behavior. For instance, as illustrated in FIGS. 5a and 5b, latching mechanism 40 may include a piston 82 and spring 84, which act on lever 50 and latch 70 to hold the latching mechanism 40 in either a fully opened position (as shown in FIG. 5a) or a fully closed position (as shown in FIG. 5b). Such a mechanism may indicate to the user that there are only two useful positions for lever 50. Additionally, this bi-stable behavior also assists in lens installation and removal by keeping the latch in a fully opened position when the user is installing and/or removing the lens.

To more fully illustrate the functionality associated with certain embodiments of eyewear 10, the following description of an example lens replacement process is provided with reference to various components previously described and illustrated in FIGS. 1-5. Replacement of a lens 20 may be divided into two distinct processes: 1) lens removal; and 2) lens installation. The process of removing a lens 20 may begin by shifting latching mechanism 40 to an open position. As mentioned, shifting latching mechanism 40 to a fully opened position may require moving latching mechanism 40 through a maximum stress state between the fully opened and fully closed positions. Once latching mechanism 40 passes the maximum stress position it may naturally remain in the fully open position. In certain embodiments, a piston 82 and spring 84 may facilitate holding lever 50 of latching mechanism 40 in a fully opened position. When latching mechanism 40 is opened, lobe 42 is disengaged from latch catch 24 thereby clearing a path for lens 20 to exit frame 30. In certain embodiments, lens 20 may be removed from frame 30 by pivoting latch catch 24 about tab 22 positioned in recess 32 of frame 30. Once latch catch 24 is clear from frame 30, tab 22 may disengage from recess 32 and lens 20 may feely exit frame 30.

After removing lens 20 from frame 30 a replacement lens 20 may be installed. The lens installation procedure may begin by shifting lever 50 such that latching mechanism is in a fully opened position. At this point, tab 22 of lens 20 may be positioned in recess 32 of frame 30 and lens 20 may be pivotally rotated to align lobe 42 of latching mechanism 40 with latch catch 24. Next, lever 50 may be adjusted to shift latching mechanism 40 to a fully closed position. As latching mechanism 40 moves into a fully closed position, lobe 42 may engage latch catch 24 and align an upper portion of lens 20 with lens groove 34 of frame 30. Additionally, shifting latching mechanism 40 to a fully closed position may gradually place lens 20 in compression and a portion of frame 30 in tension. The paired forces may induce an interference fit whereby lens 20 is securely retained in frame 30. While a particular lens replacement process has been described, it should be noted that certain steps may be rearranged, modified, or eliminated where appropriate.

Modifications, additions, or omissions may be made to eyewear 10 and the described components. As an example, eyewear 10 may have a 3-piece shield" design which does not have a frame. In such an embodiment, eyewear 10 may include a single lens having a nose piece and two arm attachments connected to the lens by a plurality of latching mechanisms. Additionally, while certain embodiments have been described in detail numerous changes, substitutions, variations, alterations and modifications may be ascertained by those skilled in the art, and it is intended that the present disclosure encompass all such changes, substitutions, variations, alterations and modifications as falling within the spirit and scope of the appended claims.

What is claimed is:

1. An eyewear system comprising:
  a partially entrapped eyewear frame comprising a lens groove and a recess;

at least one lens configured to be received into the lens groove of the partially entrapped eyewear frame, the lens comprising:
a first edge comprising a latch catch;
a second edge comprising a tab configured to be received by the recess of the partially entrapped eyewear frame; and
at least one latching mechanism, the latching mechanism configured to:
allow removal of the lens from the partially entrapped eyewear frame; and
engage the latch catch of the lens to retain the lens in the partially entrapped eyewear frame.

2. The eyewear system of claim 1, wherein the latching mechanism is configured to apply a compressive force to the lens.

3. The eyewear system of claim 2, wherein the lens groove is configured to counteract a compressive force applied to the lens.

4. The eyewear system of claim 1, wherein the partially entrapped eyewear frame further comprises a second lens groove and a second recess, the eyewear system further comprising:
a second lens configured to be received into the second lens groove of the partially entrapped eyewear frame, the lens comprising:
a first edge comprising a latch catch;
a second edge comprising a tab configured to be received by the second recess of the partially entrapped eyewear frame; and
a second latching mechanism configured to:
allow removal of the second lens from the partially entrapped eyewear frame; and
engage the latch catch of the second lens to retain the second lens in the partially entrapped eyewear frame.

5. The eyewear system of claim 1, wherein the latching mechanism has a first low energy state associated with an opened position, a second low energy state associated with a closed position, and a high energy state associated with a position between the open position and the closed position.

6. The eyewear system of claim 1, wherein the partially entrapped eyewear frame is in tension when the lens is retained in the partially entrapped eyewear frame.

7. The eyewear system of claim 1, wherein the latching mechanism is positioned on a lateral portion of the partially entrapped eyewear frame.

8. The eyewear system of claim 1, wherein the latching mechanism comprises:
an lever;
a latch coupled to the lever comprising at least one pin and a lobe; and
a cap comprising a slot for receiving the pin, the slot configured to control the motion of the lobe.

9. The eyewear system of claim 8, wherein positioning the lever in a closed position shifts the lobe to engage the latch catch of the lens.

10. The eyewear system of claim 8, wherein the latching mechanism further comprises:
a barrel; and
a second slot configured to:
receive the barrel; and
control the motion of the barrel.

11. The eyewear system of claim 8, further comprising:
a piston coupled to the latch; and
a spring coupled to the piston.

12. An eyewear system comprising:
a partially entrapped eyewear frame comprising a lens groove and a recess:
at least one lens configured to be received into the lens groove of the partially entrapped eyewear frame, the lens comprising:
a first edge comprising a latch catch;
a second edge comprising a tab configured to be received by the recess of the partially entrapped eyewear frame
at least one latching mechanism, the latching mechanism configured to:
allow removal of the lens from the partially entrapped eyewear frame; and
engage the latch catch of the lens to retain the lens in the partially entrapped eyewear frame; and
wherein the latching mechanism comprises a lever and a lobe, wherein positioning the lever in a closed position shifts the lobe to engage the latch catch of the lens.

* * * * *